Oct. 17, 1961   R. H. COLLEY   3,004,442
REMOTE CONTROL APPARATUS
Filed May 13, 1958
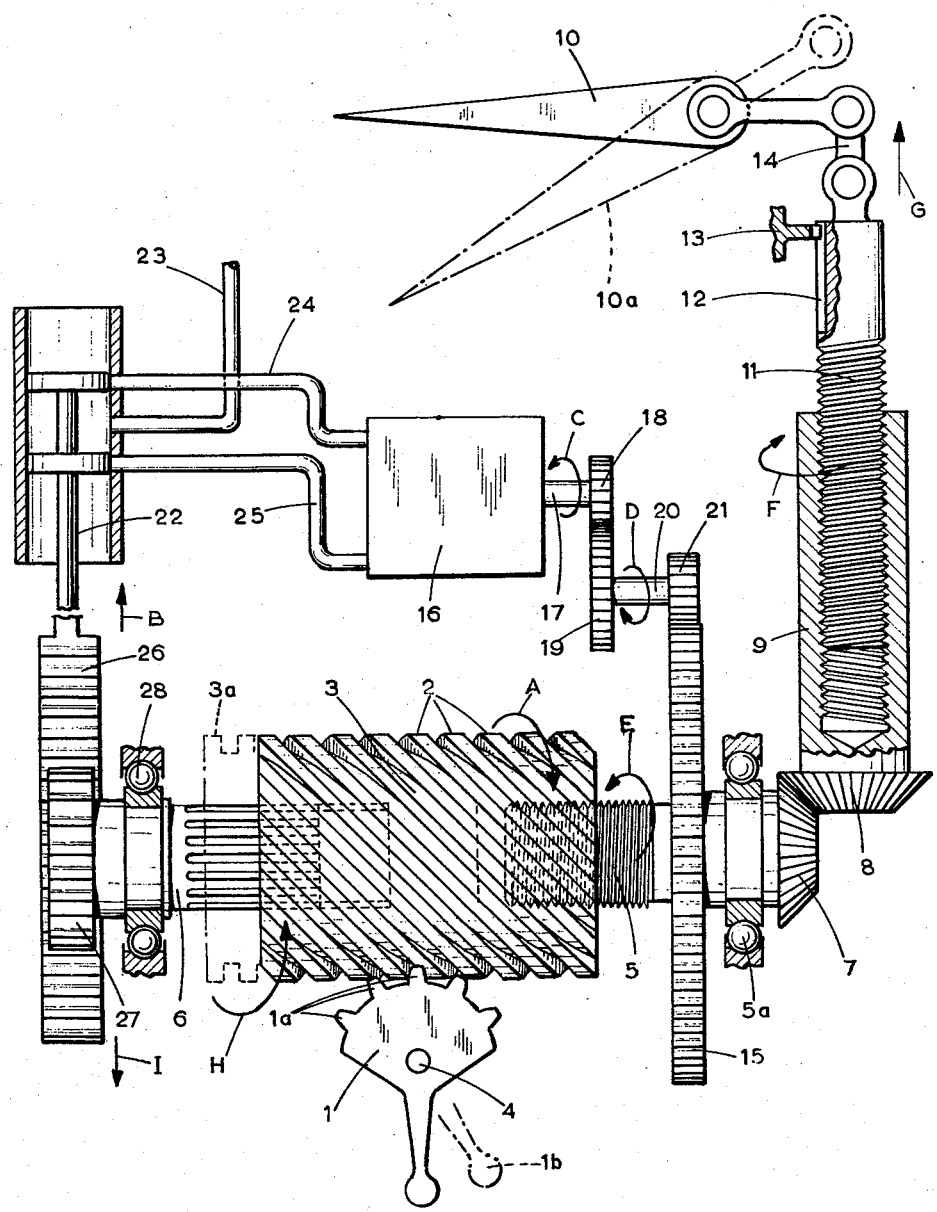
Rowan Herbert Colley
INVENTOR
BY Leech & Radue
ATTORNEYS United States Patent Office 3,004,442
Patented Oct. 17, 1961

3,004,442
REMOTE CONTROL APPARATUS
Rowan Herbert Colley, Sunny Hill, Derby, England, assignor to Rolls-Royce Limited, Derby, England, a British company
Filed May 13, 1958, Ser. No. 735,009
Claims priority, application Great Britain May 17, 1957
4 Claims. (Cl. 74—388)

This invention relates to remote control apparatus and is specifically concerned with such apparatus in which the position of a remotely controlled member is selected by means of a positional control member, there being provided power driving means therebetween for operating the controlled member.

According to the present invention remote control apparatus of the type specified comprises a control member adapted to be moved in either of two opposite directions, a helically-toothed member engaged by tooth formations on the control member so that the said helically toothed member is caused to rotate in a direction dependent upon the direction of movement of the control member and to an extent depending on the extent of displacement of the control member, a third member to which said helically toothed member is coupled for rotation, means operated by the said third member to bring into operation power driving means which operates in a direction dependent upon the direction of rotation of the third member, connecting means between said power driving means and the member to be controlled to move the same, and connecting means between said power driving means and a fourth member in threaded engagement with said helically toothed member, whereby rotation of said fourth member causes axial movement of the helical member against the fixed abutment of the tooth formations on the control member with resultant rotational movement until the consequent rotation of the third member renders the power driving means inoperative.

In constructions according to the present invention the helix angle of the helically-toothed member should be such that the movement of the control member can cause rotation of the helically-toothed member, while axial movement of the helically-toothed member arising from the rotation of the fourth member in threaded engagement therewith also causes rotation of the helically-toothed member against the fixed abutment of the features on the control member. Thus the helix angle may be 45° or less with respect to the longitudinal axis of the member.

Preferably the third member consists of a shaft slidable in the helically toothed member and having external splines which engage in internal splines on the latter, said shaft carrying a pinion in engagement wtih a rack through which it operates a valve to communicate a source of fluid under pressure to cause rotation of a fluid power driving means in a direction dependent upon the direction of displacement of the valve.

The fluid power driving means may drive through gears a jack member, one part of which is movable axially to adjust the position of the member to be controlled.

The fourth member may consist of a shaft connected for rotation to the power driving means and having a part externally threaded engaging in internal threads in a bore within the helically toothed member.

According to a further feature of the invention the control member is operated by means of a screw jack which is driven by the power driving means.

One preferred embodiment of the invention is illustrated in the accompanying drawing, which shows diagrammatically a remote control operating a flap member in accordance with the selected position of a control lever.

Referring to the figure, the control lever is shown at 1, having tooth features 1a, engaging helical tooth formations 2 on a nut member generally shown at 3. The helix angle of the tooth formations 2 is substantially 45° whereby movement of the control lever 1 about pivot axis 4 will cause rotation of the nut member, while alternatively axial movement of the nut member, the control lever 1 being fixed, will also cause rotation of the nut member.

The nut member is supported jointly by a threaded shaft 5 and an aligned splined shaft 6. The threaded shaft 5 is borne in a journal thrust bearing 5a and supports a bevel gear 7 engaging a bevel gear 8 rotating with the threaded nut member 9 of a screw jack actuating a flap member 10. The externally threaded member of the screw jack is shown at 11 and is restrained from rotation by a spline formation 12 engaged by a key device 13. The screw member 11 is linked at 14 to the flap member 10.

The screw shaft 5 also supports a large-diameter spur gear wheel 15 forming part of a reduction gear power train from a power driving motor diagrammatically illustrated at 16. The drive shaft of the power driving motor 16 is shown at 17 supporting pinion 18 engaging pinion 19 on shaft 20, the latter also supporting a pinion 21 engaging the gear wheel 15.

The power driving motor is of the reversible kind, being supplied with fluid under pressure in accordance with the operation of a landed valve member 22. The fluid pressure supply line to the valve is shown at 23, the arrangement being such that if the valve member 22 is raised pressure fluid is supplied to the pipeline 24, while the pipeline 25 provides an exhaust duct. Alternatively, if the valve 22 is lowered then pressure fluid is supplied through the pipeline 25 and exhausts through the pipeline 24.

Movement of the valve 22 is controlled by actuation of rack member 26 which is engaged by a pinion 27 on the splined shaft 6, the latter being borne in a journal thrust bearing 28.

The operation of the apparatus described is as follows:

Assume the control lever 1 to be moved to the position 1b. This will cause rotation of the nut member 3 in the direction of the arrow A; thus the splined shaft 6 will rotate in the same direction, causing the pinion 27 to move the rack member 26 in the direction of the arrow B. This movement raises the valve member to supply pressure fluid to the pipeline 24. The power supply in this sense causes rotation of the drive shaft 17 in the direction of the arrow C, the shaft 20 rotating in the direction of the arrow D and the shaft 5 rotating in the direction of the arrow E. In this manner the external or nut member 9 of the screw jack rotates in the direction of the arrow F and co-operating with the rotationally fixed screw member 11 will cause elongation of the jack in the sense of the arrow G. The flap member 10 will thus be depressed.

It will be noted that the sense of the screw thread on the screwed shaft 5 is such that rotation of the shaft 5 in the direction of the arrow E will cause the nut member 3 to move to the left. This movement against the fixed reaction of the tooth features 1a of the control lever 1 will cause rotation of the nut member in the sense of arrow H. This rotation will cause the rack member 26 to move downwardly in the direction of the arrow I, lowering the valve member 22, until such time as it reaches a position in which the pressure fluid supply to the pipeline 24 is cut off.

It will be noted that according to the pitch of the thread on the screwed member 5, the nut member 3 will move to a position as shown by the dotted lines 3A at the left-hand side of the nut member, this position being reached when the valve member 22 has been restored to its equilibrium position in which the power supply both to line 24 and line 25 is cut off. Again when this position has been reached the flap member 10 will be depressed to a position shown by the dotted lines at 10A.

It will be appreciated that the extent to which the flap member 10 is moved is dependent upon the extent to which the control lever 1 is displaced.

The operation of the apparatus in the reverse sense is similar to that described. For example when the control lever is moved from the dotted position 1b to the full line position as shown at 1, the rotation of the various parts will be in the reverse sense, the valve 22 being lowered whereby pressure fluid is supplied to the pipeline 25 and the sense of rotation of the drive shaft 17 is opposite to that shown by the arrow C. When the flap member has reached its original position as shown by the full lines 10 the nut member will have returned to its full line position and the valve member 22 will again be in the equilibrium position in which both pipelines 24 and 25 are cut off from the power supply.

While in the embodiment above described the power driving means is in the form of a fluid pressure motor, it will be appreciated that an alternative power driving means may be used, for example a reversible electric motor. In such an arrangement the rack 22 can be used to actuate switches controlling the power supply to the electric motor.

Again while the embodiment described shows a quadrant device engaging the nut member 3, an alternative arrangement may provide a helically-toothed member, for example in the form of a pinion, which is axially movable relative to the nut, being restrained against rotation. The axial movement of such a pinion will cause rotation of the nut member in a manner comparable with the movement of the control lever 1. Alternatively such a helically-toothed pinion may be borne for rotation, whilst being axially located, the selected position of the control member being obtained by rotation through a selected angle.

I claim:

1. A remote power actuator including in combination, a normally stationary member to be moved to and retained at a desired selected position, power driving means of the reversible type, a source of power for said means, a power train positively connecting said driving means to said member for solely actuating the latter, a control device having a neutral position and arranged for applying said power source to said driving means selectively to determine the direction of drive, a cylindrical member having helical teeth, means responsive solely to rotation of said cylindrical member to actuate said control device, means responsive to relative rotational motion between said power train and said cylindrical member to move the latter axially, a control member movable independently of the power train having tooth means engaging the helical teeth of the cylindrical member to rotate the latter selectively in a direction dependent on the direction of movement of the control member, and, means mounting said control member so that axial movement of the cylindrical member in respect to its tooth means causes rotation of the cylindrical member to restore the control device to its neutral position.

2. The power actuator of claim 1 in which said power control device is constructed to determine by the amount of movement imparted to it from its neutral position the degree of movement given the member to be controlled and its stopped position.

3. The power actuator of claim 1 in which the source of power is a fluid under pressure and the control device is a valve.

4. The power actuator of claim 1 in which said cylindrical member is mounted for rotation about its axis on coaxial shafts one longitudinally splined for relative reciprocation in said member and the other having threaded engagement therewith, said first shaft being connected to actuate said control device and means connecting the second to be positively rotatively driven by said power train.

References Cited in the file of this patent
UNITED STATES PATENTS

| | | |
|---|---|---|
| 1,868,082 | Swartz | July 19, 1932 |
| 2,105,473 | Dean | Jan. 18, 1938 |
| 2,344,547 | Halford et al. | Mar. 21, 1944 |
| 2,475,461 | Roberts | July 5, 1949 |
| 2,583,407 | Binder | Jan. 22, 1952 |
| 2,695,145 | Lear et al. | Nov. 23, 1954 |
| 2,763,164 | Neklutin | Sept. 18, 1956 |